US009440556B2

(12) United States Patent
Loos et al.

(10) Patent No.: US 9,440,556 B2
(45) Date of Patent: Sep. 13, 2016

(54) ANTI-SKID CONTROL DEVICE FOR A VEHICLE HAVING AN ELECTROMOTIVE DRIVE SYSTEM

(75) Inventors: Sebastian Loos, Ingolstadt (DE); Dirk Hirschmann, Dachau (DE); Bodo Kleickmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 176 days.

(21) Appl. No.: 14/115,996

(22) PCT Filed: Feb. 28, 2012

(86) PCT No.: PCT/EP2012/000852
§ 371 (c)(1),
(2), (4) Date: Jan. 7, 2014

(87) PCT Pub. No.: WO2012/152347
PCT Pub. Date: Nov. 15, 2012

(65) Prior Publication Data
US 2014/0336856 A1 Nov. 13, 2014

(30) Foreign Application Priority Data
May 6, 2011 (DE) .......................... 10 2011 100 814

(51) Int. Cl.
*B60L 15/20* (2006.01)
*B60L 3/10* (2006.01)
*B60K 7/00* (2006.01)

(52) U.S. Cl.
CPC ............ *B60L 15/2072* (2013.01); *B60L 3/102* (2013.01); *B60L 3/106* (2013.01); *B60K 7/0007* (2013.01);
(Continued)

(58) Field of Classification Search
CPC ......... B60K 7/00; B60K 7/0007; B60L 3/10;
B60L 15/20; B60L 15/2072; B60L 3/106;
B60L 3/102; B60L 2220/42; B60L 2220/46;
B60L 2240/461; B60L 2240/465; B60L
2260/28; B60W 40/10; B60W 10/18; Y02T
10/648; Y02T 10/7258
USPC ...................... 701/70, 81; 180/6.48; 303/151
See application file for complete search history.

(56) References Cited

U.S. PATENT DOCUMENTS 5,432,418 A * 7/1995 Jeanneret ........................ 318/34
2005/0246087 A1 11/2005 Hommi et al.
(Continued)

FOREIGN PATENT DOCUMENTS

CN 101024377 A 8/2007
CN 101088818 A 12/2007
(Continued)

OTHER PUBLICATIONS

International Search Report issued by the European Patent Office in International Application PCT/EP2012/000852.
(Continued)

*Primary Examiner* — Jerrah Edwards
*Assistant Examiner* — Tamara Weber
(74) *Attorney, Agent, or Firm* — Henry M. Feiereisen LLC

(57) ABSTRACT

An anti-slip control device for a vehicle having an electromotive drive system includes one or more electric driving motors. In order to limit wheel slip, the rotational speed of the driving wheels is regulated by controlling the rotational speed of the rotary field generated in at least one electric driving motor, each electric driving motor being fed by a controllable converter associated therewith. In order to control the rotational speed, the anti-slip control device constantly informs each converter about the maximum allowed rotational speed of the driving motor or driving wheel associated with the respective converter.

5 Claims, 1 Drawing Sheet

(52) U.S. Cl.
CPC ......... *B60L 2220/42* (2013.01); *B60L 2220/46* (2013.01); *B60L 2240/461* (2013.01); *B60L 2240/465* (2013.01); *B60L 2260/28* (2013.01); *Y02T 10/648* (2013.01); *Y02T 10/7258* (2013.01)

(56) References Cited

U.S. PATENT DOCUMENTS

| | | | |
|---|---|---|---|
| 2005/0274560 A1* | 12/2005 | Wakao et al. | 180/197 |
| 2007/0089916 A1* | 4/2007 | Lundstrom | 180/6.48 |
| 2007/0095589 A1 | 5/2007 | Tamai et al. | |
| 2008/0264709 A1 | 10/2008 | Fenker et al. | |
| 2009/0124453 A1* | 5/2009 | Seel et al. | 477/5 |
| 2009/0210128 A1* | 8/2009 | Fujimoto et al. | 701/84 |
| 2010/0084935 A1* | 4/2010 | Jadric et al. | 310/112 |
| 2010/0161194 A1 | 6/2010 | Tursik et al. | |
| 2011/0208398 A1* | 8/2011 | Inoue et al. | 701/93 |

FOREIGN PATENT DOCUMENTS

| | | |
|---|---|---|
| DE | 101 35 192 A1 | 1/1997 |
| DE | 195 49 259 A1 | 3/1997 |
| DE | 195 40 067 A1 | 4/1997 |
| DE | 197 32 460 A1 | 2/1999 |
| DE | 199 61 805 A1 | 7/2001 |
| DE | 10 2006 050 860 A1 | 5/2007 |
| DE | 103 93 181 B4 | 6/2007 |
| DE | 10 2007 017 821 A1 | 10/2008 |
| DE | 10 2009 058 531 A1 | 7/2010 |
| EP | 0 085 394 A1 | 8/1983 |
| EP | 0 486 996 A2 | 5/1992 |
| EP | 0 521 162 A1 | 1/1993 |
| JP | 6-191389 A | 7/1994 |
| WO | WO9708008 A1 | 3/1997 |

OTHER PUBLICATIONS

Chinese Search Report issued on Apr. 22, 2015 with respect to counterpart Chinese patent application 201280022057.0.

Translation of Chinese Search Report issued on Apr. 22, 2015 with respect to counterpart Chinese patent application 20128002257.0.

* cited by examiner

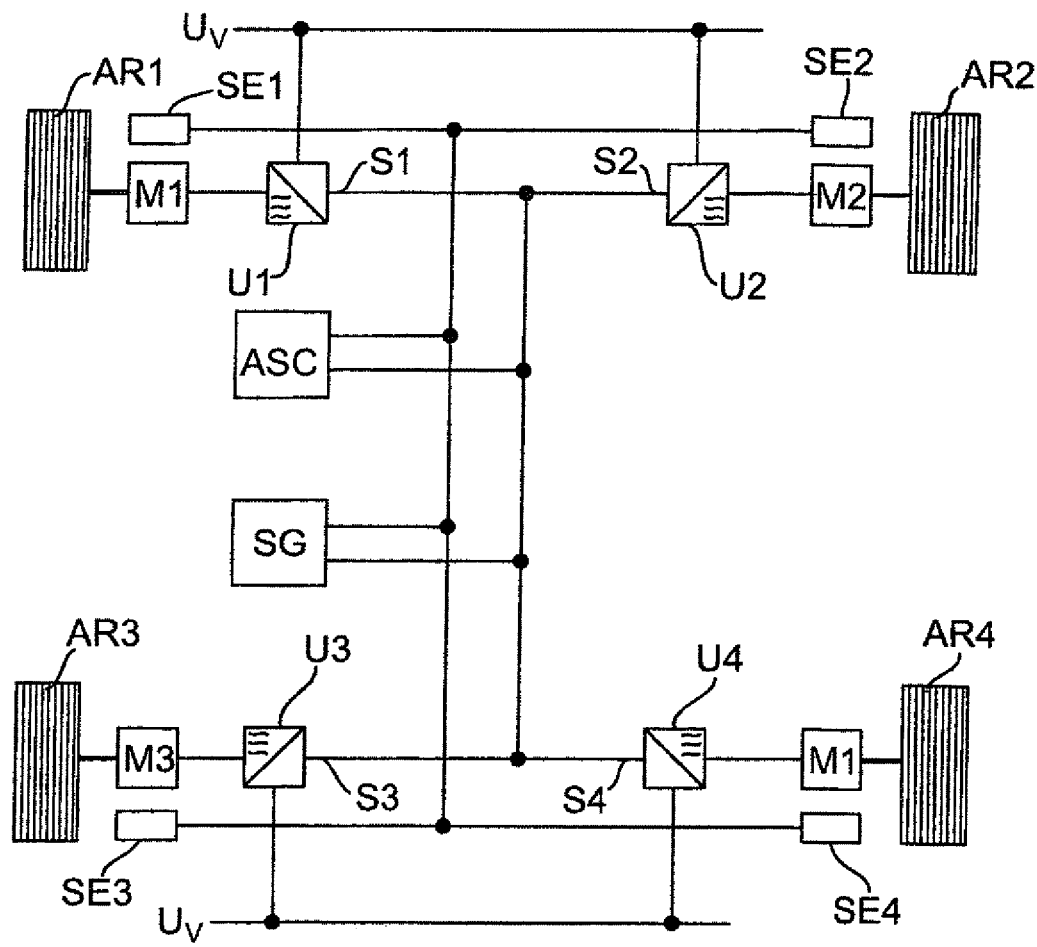

ANTI-SKID CONTROL DEVICE FOR A VEHICLE HAVING AN ELECTROMOTIVE DRIVE SYSTEM

CROSS-REFERENCES TO RELATED APPLICATIONS

This application is the U.S. National Stage of International Application No. PCT/EP2012/000852, filed Feb. 28, 2012, which designated the United States and has been published as International Publication No. WO 2012/152347 and which claims the priority of German Patent Application, Serial No. 10 2011 100 814.8, filed May 6, 2011, pursuant to 35 U.S.C. 119(a)-(d).

BACKGROUND OF THE INVENTION

The invention relates to a device for skid control for a vehicle with electromotive vehicle drive according to the preamble of patent claim 1.

Devices for anti-slip control (ASC) have the purpose to prevent slip of the drive wheels during acceleration. The goal is on one hand to achieve an acceleration for the vehicle which is as efficient as possible and on the other hand to not unnecessarily adversely affect the stability of the vehicle during acceleration.

When the wheel slip becomes excessive there are generally two options to intervene by means of an anti-slip control. On one hand the motor torque can be reduced via the motor control when for example the drive axle as a whole has an excessive slip. However, when the slip is only excessive on one drive wheel or when the slip is too great, the slip can be reduced by braking. However, anti-slip control by means of breaking has the disadvantage that the drive wheels are often decelerated excessively thus resulting in loss of traction potential.

Electromotive vehicle drives that use electric machines as drive motors and can be operated in the motor mode as well as in the generator mode, have a rotational torque which is generated by the Lorentz force and has a positive value for acceleration and a negative value for deceleration. The Lorentz force is proportional to the cross product of the current in the stator and the magnetic flux, which permeates the stator and the rotor. Owing to this circumstance, the rotational torque in an electric machine cannot only be changed by changing the current and the magnetic flux but also by the angle formed between the two vector values. During control of electric machines the voltage at the clamps of the machine is therefore changed so that the rotational torque resulting from the cross product assumes the desired value. In which manner the three values can be adjusted or adapted strongly depends on the respective type of machine. In rotating-field machines, the current vector rotates in the stator with the same speed as the magnetic field (rotational field) for generating a rotational torque. In synchronous machines, the direction of the rotational field is predetermined by its construction. In order to generate a constant force, the rotor therefore has to rotate with the same speed at which the current in the stator rotates. When the current leads the field, a positive rotational torque (acceleration) results and when it lags the field a negative torque (braking) results.

From WO 97/08008 and anti-slip control system for a motor vehicle using an electric machine is known in which a rotational torque is predetermined for the anti-slip control (ASC) of the electric machine. The anti-slip control only becomes active when it is detected that a threshold value of the drive slip is exceeded.

From DE 197 32 460 A1 and method for controlling a multi-motor drive with a common converter for controlling the drive motors is known. In this known method the output frequency of the converter is adapted to the rotational speed of the drive wheels, which have a good contact to the street. This is intended to prevent a runaway of the output frequency of the converter during acceleration processes due to the slip of at least one drive wheel. The drive wheels that have good contact to the street then ensure an acceleration of the vehicle.

The invention is based on the object to create a device for anti-slip control for a vehicle with electromotive vehicle drive with which good acceleration values for the vehicle can be achieved.

SUMMARY OF THE INVENTION

This object is solved by a device for anti-slip control for a vehicle with electromotive vehicle drive, including at least one electric drive motor driving a respective drive wheel; at least one controllable converter operatively coupled with the at least one drive motor to establish a rotary field in the at least one electric drive motor; an anti-slip control device continuously communicating to the at least one converter a maximal admissive rotational speed of the at least one drive motor or of the drive wheel, thereby causing the at least one controllable converter to limit a rotational speed of the rotary field commensurate with the maximal admissive rotational speed. Preferred refinements of the invention are disclosed in the dependent claims.

According to the invention, each electric drive motor is supplied by an converter that is assigned to the electric drive motor, which converter itself is continuously informed by an anti-slip control device (ASC=anti slip control) of the maximum rotational speed of the associated drive wheel for controlling the rotational field. The maximal rotation speed is selected so that the slip is preferably within a range between 10% to 20% i.e., the maximum rotational speed is set so that the rotational speed of the drive wheel is maximally 10% to 20% higher than the driving speed of the vehicle. Any rotational speeds below this maximal set rotational speed are admissive. Should in the electromotive vehicle drive the rotational speed of the drive motor not correspond to the associated drive wheel because a transmission is interconnected, the converter can also be informed of the rotational speed of the drive motor by the anti-slip control device instead of the rotational speed of the drive wheel.

In order to enable a comparison in the converter between the maximal set value for the rotational speed of the associated drive wheel and the actual value of the rotational speed if needed, the converter can also additionally be provided with this actual value as comparison value. Another possibility is to determine the rotational speed differential between the maximal set value and the actual value of the rotational speed of the associated drive wheel directly in the converter. Important in all embodiments is that the corresponding rotational speed information is available directly at the converter so that the converter is able to regulate the control of the drive motor associated with the converter so that a direct rotational speed limitation can occur when the predetermined slip threshold is reached.

When the electromotive vehicle drive is configured to include synchronous machines as drive motors, the control of the converter can be limited such that the converter limits the rotational speed of the rotational field so that the rotational speed does not exceed the driving-state dependent predetermined maximum rotational speed of the drive motor. The reason why this is possible in this manner is that in synchronous machines the rotating field always has the same rotational speed as the rotor of the synchronous machine. Thus in this case it is only necessary to limit the rotational speed of the rotating field so that the maximal rotational speed set by the ASC-control device is not exceeded. A rotational speed regulatory circuit as it is required in an asynchronous machine is not required in this case.

In particular in the case of a drive system with very different drive torques as they can occur in single wheel drive, the anti-slip control device also ensures that the drive torques of the drive wheels, which do not operate at the slip thresholds, are limited to a value that is acceptable with regard to driving dynamics. The driving stability is thus given preference over a maximal acceleration. At maximal acceleration the drive slip can be lowered for safety reasons below the preferred range of 10% to 20%, especially also by intervention of an electronic stability routine.

BRIEF DESCRIPTION OF THE DRAWING

In the following, the invention is explained in more detail by way of a block switching circuit shown in the drawing according to FIG. 1.

DETAILED DESCRIPTION OF PREFERRED EMBODIMENTS

The exemplary embodiment shown in FIG. 1 shows the drive system as block diagram for a four-wheel vehicle with single wheel drive. The drive wheels AE1 to AR4 are each driven by an associated electric motor M1 to M4. The electric motors M1 to M4 are supplied with a three-phase rotational current by respective associated converters U1 to U4. On the input side, the converters U1 to U4 are connected to the supply voltage $U_v$. On the control outputs S1 to S4 the converters U1 to U4 are connected with an ASC control device and a further control device SG which can be the motor control device of the vehicle. The ASC control device ASC and the control device SG are additionally connected with sensor units SE1 to SE4 via control lines, which sensor units transmit drive-specific information to the control devices ASC and SG. The sensor units SE1 to SE4 detect in particular the rotational speeds of the drive wheels AR1 to AR4 with which the rotational speeds of the drive wheels AR1 to AR4 can be calculated in the control device ASC and/or SG. By comparison of the respective actual driving speed of the vehicle the respective drive slip for each drive wheel AR1 to AR4 can be concluded from the rotational speeds of the drive wheels AR1 to AR4.

When for example a maximal drive slip of 14% is predetermined by the control device SG for the actual driving situation the maximal wheel rotational speed $n_{max}$ can be calculated therefrom as follows:

$N_{max} = v_{max}/2\pi r$ wherein $v_{max}$ is the rotational speed of the drive wheels increased by the predetermined maximal slip and r is the effective wheel diameter of the respective drive wheel.

At an actual driving speed of 25 m/s, a speed $v_{max}=28.5$ meters per second results in the present example for a maximal slip of 14%. The value for the maximal wheel rotational speed $n_{max}$ determined in this way is determined individually for each of the drive wheels AR1 to AR4 based on the actual driving situation and transmitted by the control device ASC to the respective associated converters U1 to U4. In this way the converters U1 to U4 are directly controlled for limiting the wheel rotational speed of the drive wheels AR1 to AR4.

In addition to the maximal actual admissive wheel rotational speeds, the actual value of the wheel rotational speed of the associated drive wheel can also be transmitted via the control inputs S1 to S4 so that in the converter U1 to U4 a continuous comparison between actual value and set-value can be performed for the purpose of regulation.

What is claimed is:

1. A device for anti-slip control for a vehicle with electromotive vehicle drive, comprising:
   a respective electric drive motor provided for each one of respective drive wheels of the vehicle and driving the respective drive wheel;
   a controllable converter provided for each respective electric drive motor and operatively coupled with the respective electric drive motor to establish a rotary field in the respective electric drive motor; and
   an anti-slip control device continuously communicating to each said controllable converter a maximal admissive rotational speed of the respective drive motor or of the respective drive wheel, thereby causing the controllable converter to limit a rotational speed of a rotary field commensurate with the maximal admissive rotational speed.

2. The device of claim 1, wherein the maximal admissive rotational speed is a function of a maximal drive slip determined for each respective drive wheel for a maximal acceleration and of an actual driving speed of the vehicle, said maximal drive slip being a function of a driving condition of the vehicle.

3. The device of claim 2, wherein for the maximal acceleration the maximal drive slip is limited to a value between 10% to 20% of the actual driving speed of the vehicle.

4. The device of claim 1, wherein the anti-slip control device determines the maximal admissive rotational speed of the respective electric drive motor and regulates the rotational speed of the rotary field generated by the converter so as to not exceed a predetermined maximal rotational speed.

5. The device of claim 1, wherein the at least one drive motor is constructed as a synchronous machine, and wherein the rotational speed of the rotary field generated by the converter is limited to the maximal admissive rotational speed of the drive wheel associated with the converter.

* * * * *